(12) United States Patent
Yoshida et al.

(10) Patent No.: US 9,783,090 B2
(45) Date of Patent: Oct. 10, 2017

(54) SKIN MATERIAL FASTENING STRUCTURE AND SKIN MATERIAL REMOVING TOOL

(71) Applicant: YKK Corporation, Tokyo (JP)

(72) Inventors: Tomonari Yoshida, Tokyo (JP); Ryuichi Murasaki, Tokyo (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 15/082,463

(22) Filed: Mar. 28, 2016

(65) Prior Publication Data

US 2016/0318429 A1 Nov. 3, 2016

(30) Foreign Application Priority Data

Mar. 31, 2015 (JP) .............................. 2015-001550 U

(51) Int. Cl.
*B60N 2/58* (2006.01)
*B60N 2/70* (2006.01)

(52) U.S. Cl.
CPC ......... *B60N 2/5833* (2013.01); *B60N 2/5891* (2013.01); *B60N 2/7017* (2013.01)

(58) Field of Classification Search
CPC .. B60N 2/5825; B60N 2/5833; B60N 2/5891; B60N 2/7017
See application file for complete search history.

(56) References Cited

U.S. PATENT DOCUMENTS

| | | | | |
|---|---|---|---|---|
| 7,481,489 B2 * | 1/2009 | Demick | ............... | B60N 2/5825 297/218.1 |
| 8,197,010 B2 * | 6/2012 | Galbreath | ............ | B60N 2/5825 297/218.2 |
| 8,201,880 B2 * | 6/2012 | Kato | ...................... | B60N 2/002 297/180.12 |
| 8,690,257 B2 * | 4/2014 | Stiller | .................. | B60N 2/5825 24/297 |
| 8,745,827 B2 * | 6/2014 | Rocha | ................ | A44B 18/0073 24/442 |
| 8,820,833 B2 * | 9/2014 | Tsuchiya | ............... | B60N 2/5825 297/218.3 |
| 2011/0305864 A1 * | 12/2011 | Masuda | ............... | B60N 2/5833 428/86 |
| 2014/0068900 A1 * | 3/2014 | Lovasz | ................ | A47C 31/023 24/543 |
| 2014/0183925 A1 * | 7/2014 | Clauser | ................ | B60N 2/5825 297/452.38 |

* cited by examiner

*Primary Examiner* — Philip Gabler
(74) *Attorney, Agent, or Firm* — Kilpatrick Townsend & Stockton LLP

(57) ABSTRACT

A skin material fastening structure for removably fastening an edge of a first skin material covering a part of molded foam and an edge of a second skin material covering another part of the molded foam in a fastening groove formed in the molded foam. The fastening groove includes first and second sides facing each other, and a bottom extending between lower ends of the first and second sides. A hook and loop fastener is fixed on the first and second sides. Each of the edges of the first and second skin materials has loops capable of engaging with the hooks.

6 Claims, 11 Drawing Sheets

SKIN MATERIAL FASTENING STRUCTURE AND SKIN MATERIAL REMOVING TOOL

CROSS-REFERENCE TO RELATED APPLICATION

The present application claims priority of Japanese Patent Application No. 2015-001550, filed on Mar. 31, 2015 and entitled "Skin Material Fastening Structure and Skin Material Removing Tool", the entire contents of which are hereby incorporated by reference.

BACKGROUND OF THE INVENTION

The present invention relates to a skin material fastening structure and a skin material removing tool, and more specifically to a structure for removably fastening a skin material for use in seats of an automobile and the like, and a tool for removing a skin material which is fastened by the structure.

RELATED ART

Generally, a seat of an automobile is basically composed of a cushion body molded from resin foam, and a skin material for covering an outer surface of the cushion body. The skin material is made of synthetic leather, natural leather and the like. There is a need for a manner for fastening skin materials as follows. That is, a cushion body is covered with a plurality of skin materials different in color, material, etc., and a user, a dealer, etc. can replace those skin materials. As a technique to realize the manner, U.S. Pat. No. 7,481,489 discloses that a clip defining a first concave portion and a second concave portion is embedded in a cushion body when a cushion body is molded; a groove is formed in the cushion body to make the first and second concave portions open outside the cushion body; and a first fastening member which can snap fit the first concave portion is provided at an end of the first skin material and a second fastening member which can snap fit the second concave portion is provided at an end of the second skin material.
[Patent document 1] U.S. Pat. No. 7,481,489

SUMMARY OF THE INVENTION

However, in the technique disclosed in the Patent document 1, since the end of the skin material is snap fitted into the concave portion of the clip, the force of fastening the skin material would be weak, and reliability would be low because the end of the skin material is easily removed from the concave portion, for instance. Further, the width of the groove is two wide for making the two concave portions open, so the connecting part between the first and second skin materials would look complicated and unsightly.

In light of the foregoing, an object of the present invention is to provide a skin material fastening structure, in which a force to fasten a skin material is high; a groove in which the skin material is fastened can be made narrow; and at least one of the two skin materials can be easily removed with respect to the other skin material.

Another object of the present invention is to provide a skin material removing tool for removing a skin material fastened by the above-mentioned skin material fastening structure according to the present invention.

To solve the above problems, one aspect of the present invention, there is provided a skin material fastening structure for removably fastening an edge of a first skin material covering a part of a molded foam and an edge of a second skin material covering another part of the molded foam in a fastening groove formed in the molded foam, wherein the edge of the first skin material and the edge of the second skin material are in an unconnected state in the fastening groove so that the edges of the first and second skin materials are capable of being removed from the fastening groove independently of each other, wherein the fastening groove includes first and second sides facing each other, a bottom extending between lower ends of the first and second sides, and one or more hook and loop fasteners being fixed on the first and second sides, the hook and loop fasteners having a plurality of hooks, wherein each of the hooks includes a hook base and a hook head which extends from the hook base toward the bottom of the fastening groove, and wherein each of the edges of the first and second skin materials has a plurality of loops capable of engaging with the hooks.

In the present invention, one or more hook and loop fasteners, each of which includes a plurality of hooks, are fixed onto the first and second sides facing each other of the fastening groove formed in the molded foam. The hook head of each of the hooks of the hook and loop fasteners are oriented so that the hook head extends from the hook base toward the bottom of the fastening groove (herein, the fact that the hook head extends from the hook base toward an orientation means the fact that the hook is open toward the orientation.). On the other hand, a plurality of loops capable of being engaged with the hooks are provided on a surface (back surface), which faces the hook and loop fasteners, of each of the edges of the first and second skin materials (each of the edges is a portion to be inserted into the fastening groove). Thereby, the edges of the first and second skin materials are in an unconnected state in the fastening groove, and can be removed from the fastening groove independently of each other. Since the edges of the first and second skin materials can be fastened so that the edges can be removed separately, a user or a dealer can replace the first or second skin material.

According to the present invention, the first skin material and the second skin material can be the same or different from each other as described below, in color, material, surface configuration, etc. Even when the first skin material and the second skin material are the same, the skin material fastening structure according to the present invention facilitates attaching the first or second skin material again after removing and washing the skin material, or allows for removing the first or second skin material and replacing it with another skin material having a different color, material, or surface configuration.

In the present invention, the hook head of each hook of the hook and loop fasteners extends from the hook base toward the bottom of the fastening groove, in other words, each hook is open downward. Thus, the loops are not engaged with the hooks when the edges of the first and second skin materials are inserted from an upper opening of the fastening groove toward the bottom of the groove. This facilitates the insertion of the edges into the fastening groove. However, when the edges of the first and second edges are attempted to be removed after the edges are inserted in the fastening groove, the edges are not easily removed from the fastening groove because the loops are engaged with the hooks. Thus, in the skin material fastening structure according to the present invention, a force to fasten a skin material is high.

The fastening groove can be formed when the molded foam is formed. The hook and loop fastener(s) can be fixed onto the right and left side of the fastening groove when the fastening groove is formed. A method for forming a fastening groove and fixing a hook and loop fastener on a molded foam is described in PCT/JP2014/056754 filed by the applicant of the subject application. As a material of the molded foam, for example, resin foam, such as polyurethane, polystyrene, polyolefin, phenolic resin, polyvinyl chloride, urea resin, silicone, polyimide, or melamine resin can be cited, but not limited thereto. As a hook and loop fastener, a molded hook and loop fastener obtained by molding flexible resin, such as polyester, polyamide, polyolefin, polyvinyl chloride, polyester elastomer, or polyurethane, using a melt extrusion method or an injection molding method can preferably be used, but not limited thereto. A woven hook and loop fastener, etc. can be used as well.

In the present invention, the molded foam is a cushion body used, for example, for seats of an automobile or a train, but not limited thereto. The molded foam can be used, for example, for a massage chair.

In one embodiment of the present invention, the edges of the first and second skin materials in the fastening groove are in surface contact with each other. In this case, the width of the fastening groove can be narrow, and the connecting part between the first and second skin materials look simple.

In one embodiment of the present invention, each of the edges of the first and second skin materials has a plurality of loops for removal, the loops for removal being provided on one surface of each of the edges opposite to the other surface facing the corresponding hook and loop fastener and on the bottom-side. By providing such loops for removal, it becomes easy to remove the skin materials by using a skin material removing tool (60) as described later.

In one embodiment of the present invention, the second skin material is different from the first skin material. That is, in this case, the first skin material and the second skin material are different in color, material, surface configuration, or the like. By such differences in color, material, or the like of the first and second skin materials, design of a seat or the like can be diversified.

According to another aspect of the present invention, there is provided a skin material removing tool for removing at least one of the first skin material and the second skin material fastened by the skin material fastening structure according to the above-stated present invention, comprising: a tool base capable of manually moving between the edges of the first and second skin materials in the fastening groove along the longitudinal direction of the fastening groove; a loop removing part capable of being inserted between the edge of the first or second skin materials in the fastening groove and the hooks to engage with the loops of the edge of the first or second skin materials; and a guide part extending between a lower end of the tool base and a lower end of the loop removing part, wherein the guide part guides the edge of the first or second skin materials, which has been stripped off of the corresponding hook and loop fastener by the loop removing part, to an outside of the fastening groove. The tool will be described below with reference to FIGS. 4 and 5. Note that providing the loop removing part and the guide part on both sides of the tool base enables the present skin material removing tool to remove the first and second skin materials from the fastening groove at a time.

According to still another aspect of the present invention, a skin material removing tool for removing at least one of the first skin material and the second skin material fastened by the skin material fastening structure according to the present invention, comprising: a tool base capable of being inserted between the edges of the first and second skin materials in a fastening groove, the tool base including a hook arrangement area capable of facing an area provided with loops for removal in each of the first edge and the second edge, the hook arrangement area being provided with at least a first tool hook in a first part of the hook arrangement area, and being provided with at least one a second tool hook in a second part of the hook arrangement area, the first part being near an insertion end of the tool base, the second part being farther away from the insertion end of the tool base than the first part, the first tool hook including a hook base and a hook head, the hook head extending from the hook base in a direction opposite to a direction in which the tool is inserted, the second tool hook including a hook base and a hook head, the hook head extending from the hook base in a direction in which the tool is inserted. The tool will be described below with reference to FIGS. 6 to 10.

In the skin material fastening structure according to the present invention, one or more hook and loop fasteners having a plurality of hooks being open toward the bottom of the fastening groove are fixed onto the first and second sides facing each other of the fastening groove of the molded foam. On the other hand, a plurality of loops that can be engaged with the hooks are provided on the edges of the first and second skin materials. Thereby, when the first and second edges are inserted into the fastening groove, the loops are not engaged with the hooks, facilitating the insertion. On the other hand, once the edges of the first and second skin materials are inserted in the fastening groove, the edges are not easily removed from the fastening groove as the removal is attempted because the loops cab be engaged with the hooks. Thus, in the skin material fastening structure according to the present invention, a force to fasten a skin material is high. The first skin material and the second skin material are not connected, for example, with a connecting thread, and thus can be removed from the fastening groove separately and independently of each other. This facilitates a process, for example, for replacing one of the skin materials while leaving the other skin material. Further, the edges of the first and second skin materials are designed to be in plane contact with each other in the fastening groove. This design would decrease the width of the fastening groove, and make the connecting part between the first and second skin materials look simple.

DETAILED DESCRIPTION OF THE INVENTION

Figure 1:
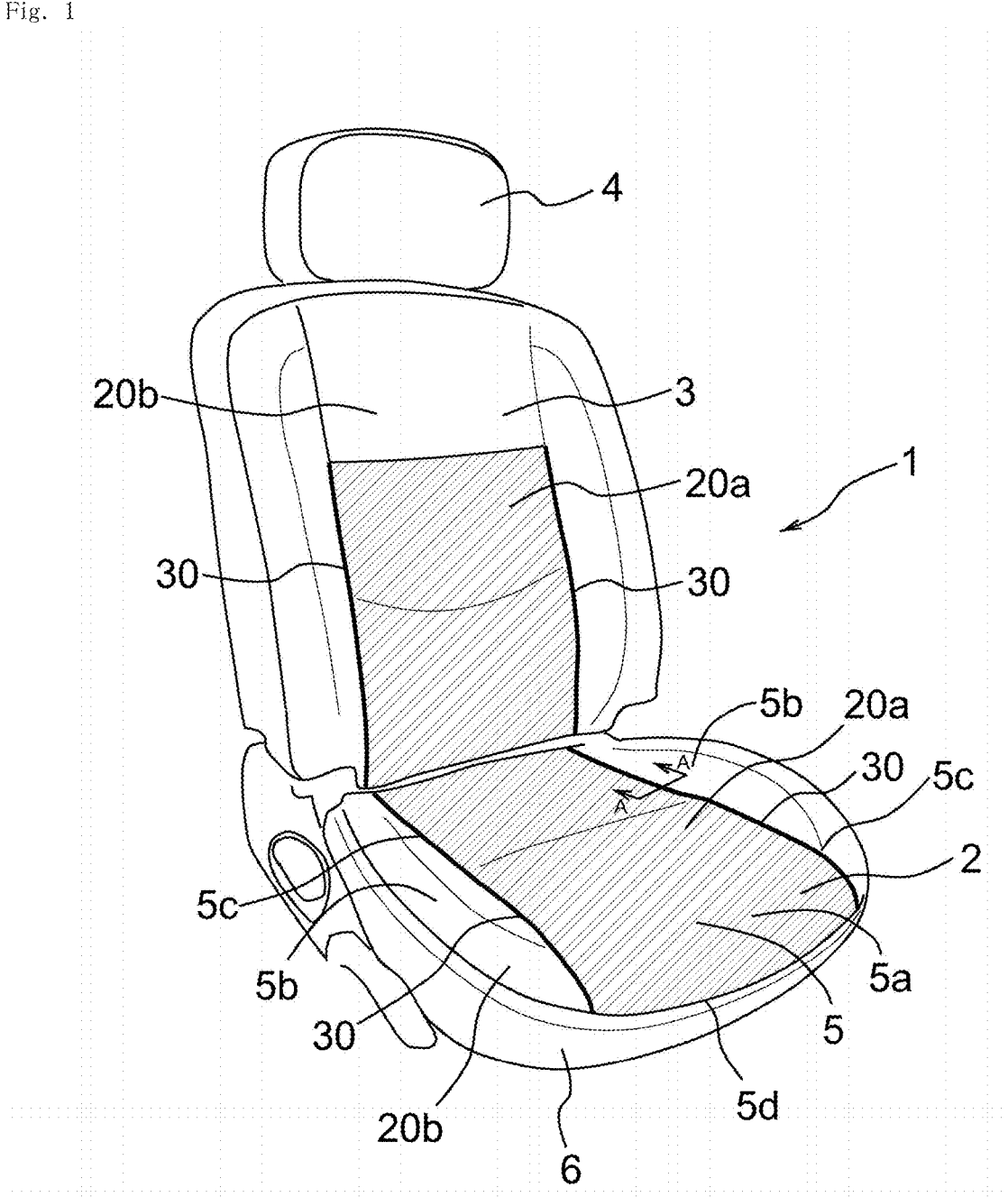
FIG. 1 is a perspective view of a seat of an automobile, which is an exemplary molded foam, to which the skin material fastening structure according to an embodiment of the present invention is applied.

An embodiment of the present invention will be described hereinafter with reference to the appended drawings. However, the present invention is not limited to the embodiment, and the embodiment can be suitably changed within the scope of claims and the range of equivalents. FIG. 1 is a perspective view of a seat 1 of an automobile. The seat 1 is an exemplary molded foam, to which a skin material fastening structure according to an embodiment of the present invention is applied. The seat 1 comprises a seat bottom 2, a seat back 3 of which angle can be adjusted relative to the seat bottom 2, and a headrest 4 attached to an upper end of the seat back 3. Each of the seat bottom 2, the seat back 3 and the headrest 4 is composed of a cushion body 10 (partially illustrated in e.g. FIG. 2) as a molded foam made of resin foam and skin materials 20a, 20b as described later, which cover an outer surface of the cushion body 10. The skin materials 20a, 20b are made, for example, of natural leather, synthetic leather, artificial leather, or plastic, but not limited to those types of leather and plastic. As described in detail below, the cushion body 10 of each of the seat bottom 2 and the seat back 3 is covered with two types of skin material, namely, with a first skin material 20a and a second skin material 20b that is different from the first skin material 20a in color, material, surface configuration and so on. As an example in this embodiment, the first skin material 20a is red and the second skin material 20b is black, but the colors are not limited thereto. Furthermore, in the seat bottom 2 and the seat back 3, the first and second skin materials 20a, 20b are not fixed with fixing means such as connecting strands or adhesive agent, and are fixed to the cushion body 10 so that the first and second skin materials can be removed independently of each other. Thus, for example, the red first skin material 20a can be removed, washed, and attached again, or, alternatively, be replaced with a new red first skin material 20a or another skin material having, for example, a different color. Note that only the first skin material 20a can be configured to be detachable. The cushion body 10 of the headrest 4 is covered only with the black second skin material in the present embodiment. However, the skin material fastening structure according to the present invention can be applied to the headrest 4 so that the headrest 4 is covered with a plurality of types of skin material.

Hereinafter, with respect to FIG. 1, a front side and a rear side from a viewpoint of a user sitting on the seat 1 are referred to respectively front and rear opposite to the front. In addition, right and left are reverse from a viewpoint of a user sitting on the seat 1 for illustrative purposes. The cushion body 10 of the seat bottom 2 of the seat 1 as exemplified in FIG. 1 includes, as outer surfaces which are covered with the skin materials 20a, 20b, an upper surface 5 and a side surface 6 extending from the front to the right and left while curving. The upper surface 5 is an area on which a user actually sits, and is separated into an approximately rectangular main area 5a longitudinally extending over the entire upper surface 5, and right and left side areas 5b beside the main area 5a. As an example in this embodiment, the main area 5a of the upper surface 5 is covered with the red first skin material 20a, and the right and left side areas 5b of the upper surface 5 and the side surface 6 are covered with the integral second skin material 20b. Thus, in the seat bottom 2, the first skin material 20a and the second skin material 20b are adjacent to each other on boundaries 5c between the main area 5a and the right and left side areas 5b, and also are in contact with each other on boundary 5d between the front end of the main area 5a and the side surface 6. As described below, in this embodiment, the skin material fastening structure according to the present invention is applied only to the boundaries 5c so that the adjacent portions of the first and second skin materials 20a, 20b are fixed at the boundaries 5c. However, the skin material fastening structure according to the present invention can be applied to the boundary 5d as well.

When the cushion body 10 is foam molded, fastening grooves 30 are formed along the entire length of the boundaries 5c between the main area 5a and the right and left side areas 5b, respectively, on the upper surface 5 of the cushion body 10 of the seat bottom 2. Each of the fastening grooves 30 linearly extends from the front end to the rear end of the upper surface 5 of the seat bottom 2. Note that the skin material fastening structure according to the present invention is applicable not only to a linear fastening groove 30 but also to a curved fastening groove (not illustrated). An edge of the first skin material 20a and an edge of the second skin material 20b, each of which corresponds to the fastening groove 30, are inserted into the fastening groove 30, and are removably fastened with hook and loop fasteners 40 fixed to the fastening grooves 30 as described in detail below. This connects between the first and second skin materials 20a, 20b at the respective right and left fastening grooves 30 on the upper surface 5 of the seat bottom 2. In this embodiment, the edges of the first and second skin materials 20a, 20b other than the edges corresponding to the fastening groove 30, for example, the front and rear edges of the first skin material 20a are removably fastened to the cushion body 10 or other parts using publicly known fastening means such as snap buttons, hook and loop fasteners without the fastening groove 30, a buckle, or a hook. Although the seat bottom 2 of the seat 1 has been described above, fastening grooves 30 are also formed vertically in the cushion body 10 of the seat back 3 on the right and left sides for fastening adjacent portions of the first and second skin materials 20a, 20b. Those fastening grooves 30 extend upward from the lower end of the seat back 3 approximately ⅔ of the vertical total length of the seat back 3. The fastening of the first and second skin materials 20a, 20b in the fastening grooves 30 in the seat back 3 is substantially the same as that in the seat bottom 2. Therefore, hereinafter the fastening in the seat bottom 2 will only be described, and a description of the fastening in the seat back 3 is omitted.

Figure 2:
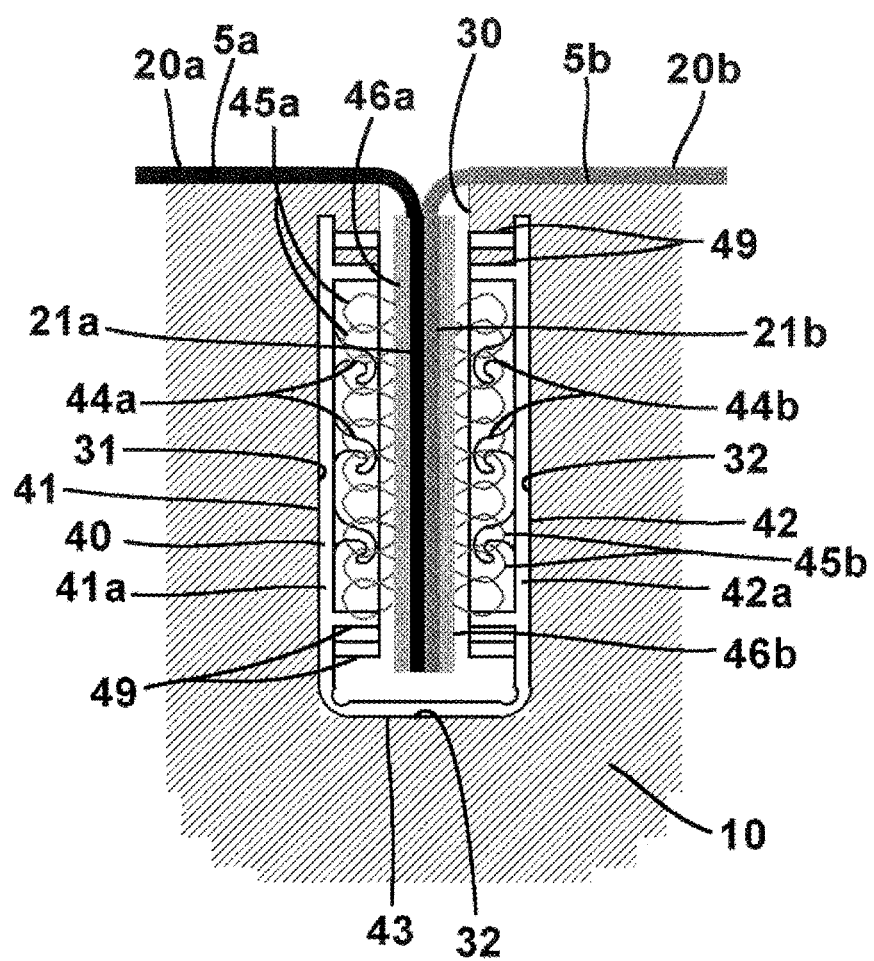
FIG. 2 is an explanatory partial cross-sectional view of a right fastening groove, taken along line A-A of FIG. 1, illustrating that the edges of the first and second skin materials are fastened in the fastening groove.
Figure 3:
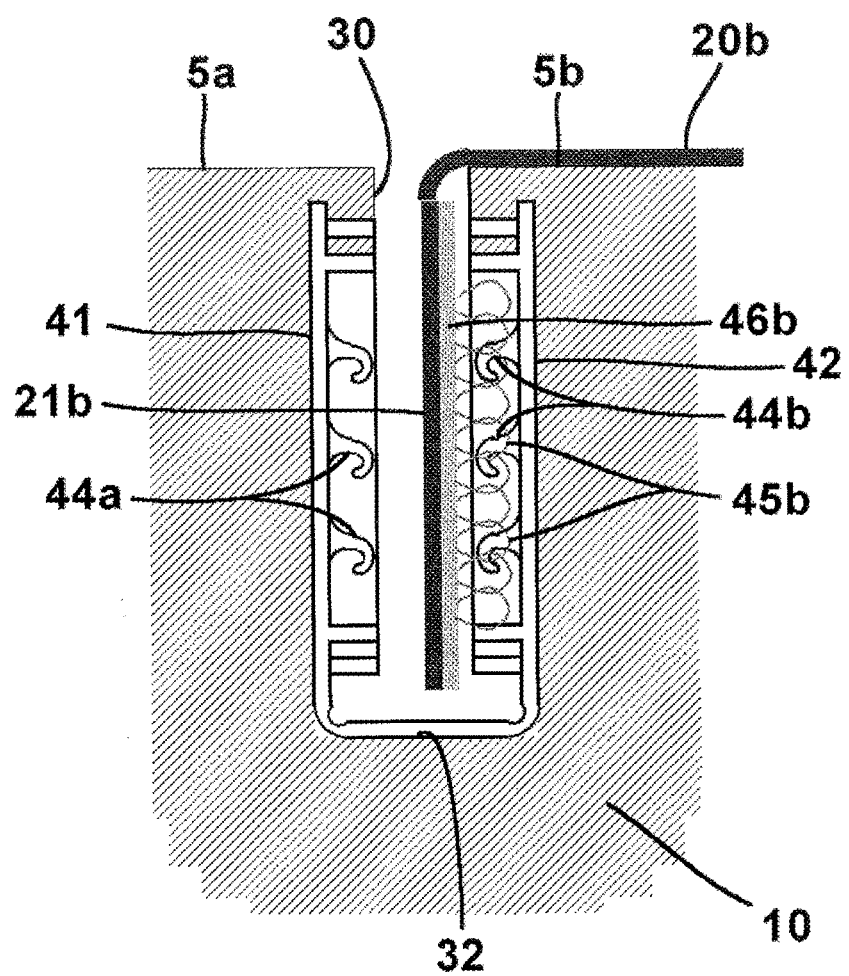
FIG. 3 is an explanatory cross-sectional view similar to FIG. 2, illustrating that only the edge of the second skin material exists in the fastening groove.

FIG. 2 is an explanatory cross-sectional view of a part of the right fastening groove 30, taken along arrow A-A of FIG. 1, illustrating that an edge 21a of the first skin material 20a and an edge 21b of the second skin material 20b are fastened in the fastening groove 30. FIG. 3 is an explanatory view similar to FIG. 2, illustrating that only the edge 21b of the second skin material 20b exists in the fastening groove 30. Note that the portion of the first skin material 20a which is to be inserted into the fastening groove 30 is referred to as the edge 21a of the first skin material 20a, and the portion of the second skin material 20b which is to be inserted into the fastening groove 30 is referred to as the edge 21b of the second skin material 20b. The fastening groove 30 has a rectangular cross-section and is open upward. The fastening groove 30 includes right and left sides 31 as a first and second sides, and a bottom 32 that connects between the lower ends of the sides 31. The right and left sides 31 are parallel to each other and face each other. The fastening groove 30 is formed when the cushion body 10 is foam molded from resin foam.

Figure 11:
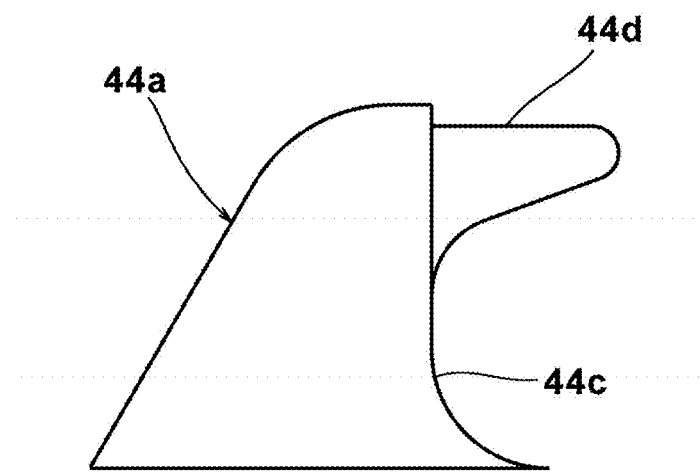
FIG. 11 is an enlarged side view of a hook.

The hook and loop fastener 40 integrally comprises a first hook and loop fastener 41 fixed to the left side 31 of the fastening groove 30, a second hook and loop fastener 42 fixed to the right side 31, and a connecting portion 43 fixed to the bottom 32 of the fastening groove 30. The connecting portion 43 connects between the lower ends of the first and second hook and loop fasteners 41, 42. The first hook and loop fastener 41 includes a first base 41a, and many first hooks 44a protruding from the first base 41a toward the second hook and loop fastener 42. As enlarged and illustrated in FIG. 11, the first hook 44a includes a hook base 44c extending from the first base 41a, and a hook head 44d extending from the hook base 44c toward the bottom 32 of the fastening groove 30. Thus, it can be said that each of the first hooks 44a is oriented so as to be open downward. In addition to the first hooks 44a, second hooks 44b and first and second tool hooks 63a, 63b also include the hook base 44c and hook head 44d as illustrated in FIG. 11. However, the direction in which the hook heads 44d of the hooks 44b, 63a, 63b extend are differently set. The second hook and loop fastener 42 similarly includes a second base 42a, and many second hooks 44b extending from the second base 42a toward the first hook and loop fastener 41. The second hook 44b is the same as the first hook 44a. The hook head of the second hook 44b extends only toward the bottom 32, and the second hook 44b is open downward. The hook and loop fastener 40 described above can be used, for example, to form the fastening groove 30 when the cushion body 10 is molded as follows. That is, when the cushion body 10 of the seat bottom 2 is foam molded, the hook and loop fastener 40 is held at a predetermined position (corresponding to the boundary 5c) on the surface of a cavity of a molding die, which surface corresponds to the upper surface 5 of the seat bottom 2, with the first and second bases 42a and 42b parallel to each other. Then, the cavity is filled with resin foam. This forms the fastening groove 30 to which the hook and loop fastener 40 is integrally fixed, and the fastening groove 30 is formed outside the hook and loop fastener 40. Note that, when the cushion body 10 of the seat bottom 2 is foam molded, a plurality of hook and loop fasteners 40 can be used in the longitudinal direction of the fastening groove 30. This enables the hook and loop fasteners 40 to flexibly fit the fastening groove 30 even if the fastening groove 30 is not linear and is curved. A method for obtaining the hook and loop fastener 40 fixed to a fastening groove 30 by forming the fastening groove 30 with the hook and loop fastener 40 when the cushion body 10 is foam molded is disclosed in PCT/JP2014/056754 filed by the applicant of the present invention. The first and second hooks 44a, 44b are provided between upper and lower walls 49. The protrusion length of each of the first and second hooks 44a, 44b is set at the same as that of each of the walls 49 in this example. Note that the protrusion length of each of the first and second hooks 44a, 44b may be shorter than that of each of the walls 49. Walls like the upper and lower walls 49 can be suitably provided at front and rear. The hook and loop fastener 40 is provided over the whole length in the longitudinal direction (in the front and rear direction) of the fastening groove 30.

Each of the skin materials 20a, 20b includes a front surface that is mainly exposed to the outside, and a back surface that is opposite to the front surface and faces the surface of the cushion body 10. On the back surface the edge 21a of the first skin material 20a, many first loops 45a capable of engaging with the first hooks 44a of the first hook and loop fastener 41 are provided as follows. That is, a base 46a in which many first loops 45a are embedded in advance is fixed onto the back surface of the edge 21a of the first skin material 20a such as by sewing. Abase 46b having many second loops 45b capable of engaging with the second hooks 44b is also fixed onto the back surface of the edge 21b of the second skin material 20b. In the example illustrated in FIG. 2, the first and second loops 45a, 45b and the bases 46a, 46b are provided only on the back surfaces of the edges 21a, 21b of the first and second skin materials 20a, 20b, respectively. However, the first and second loops and the bases are sometimes folded back from ends of the back surfaces to the front surfaces of the edges 21a, 21b of the first and second skin materials 20a, 20b, as described below with reference to FIG. 7, etc.

FIG. 2 illustrates a state where the first and second skin materials 20a, 20b are fastened in the fastening groove 30. In the state, the edges 21a, 21b of the first and second skin materials 20a, 20b are inserted into the fastening groove 30, and the first and second loops 45a, 45b are engaged with the first and second hooks 44a, 44b of the first and second hook and loop fasteners 41, 42, respectively. Since all of the first and second hooks 44a, 44b are open downward, when the edges 21a, 21b of the first and second skin materials 20a, 20b are inserted into the fastening groove 30, it is possible to insert the edges 21a, 21b into the fastening groove 30 without engaging the first and second loops 45a, 45b with the first and second hooks 44a, 44b, to a depth where the ends of the edges 21a, 21b approach the bottom 32. On the other hand, once the edges 21a, 21b of the first and second skin materials 20a, 20b are inserted in the fastening groove 30 (see FIG. 2), the edge 21a of the first skin material 20a or the edge 21b of the second skin material 20b is not easily removed from the fastening groove 30 when the removal is attempted because the first or second loops 45a, 45b are engaged with the first or second hooks 44a, 44b. Thus, it is convenient to use skin material removing tools 50, 60 described below (see FIGS. 4, 6, etc.) for removing the edge 21a or 21b of the first or second skin material 20a or 20b from the fastening groove 30. Furthermore, in the fastened state illustrated in FIG. 2, the front surface of the edge 21a of the first skin material 20a and the front surface of the edge 21b of the second skin material 20b are in surface contact with each other in the fastening groove 30. In this way, the fastening groove 30 is designed to make the front surface of the edge 21b of the first skin material 20a and the front surface of the edge 21b of the second skin material 20b contact with each other. This design can minimize the width of the fastening groove 30 (the right and left interval in FIG. 2).

FIG. 3 illustrates a state where only the edge 21b of the second skin material 20b exists in the fastening groove 30. In other words, FIG. 3 shows that the edge 21a of the first skin material 20a is removed from the fastening groove 30 from the state in FIG. 2, or that the edge 21a of the first skin material 20a is about to be inserted in the fastening groove 3 after the edge 21b of the second skin material 20b is fastened.

Figure 4:
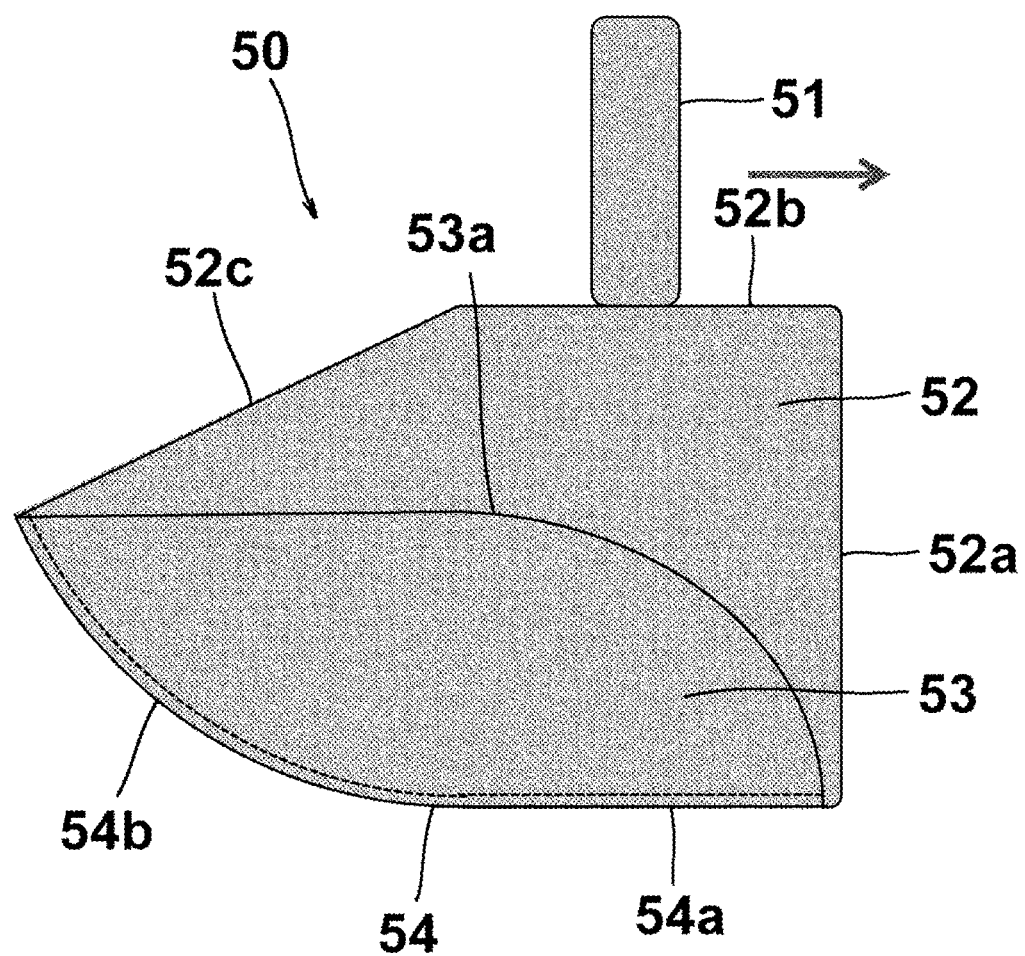
FIG. 4 is a side view of a skin material removing tool according to an embodiment of the present invention for removing the edge of the first or second skin material that is fastened as illustrated in FIG. 2 from the fastening groove.
Figure 5:
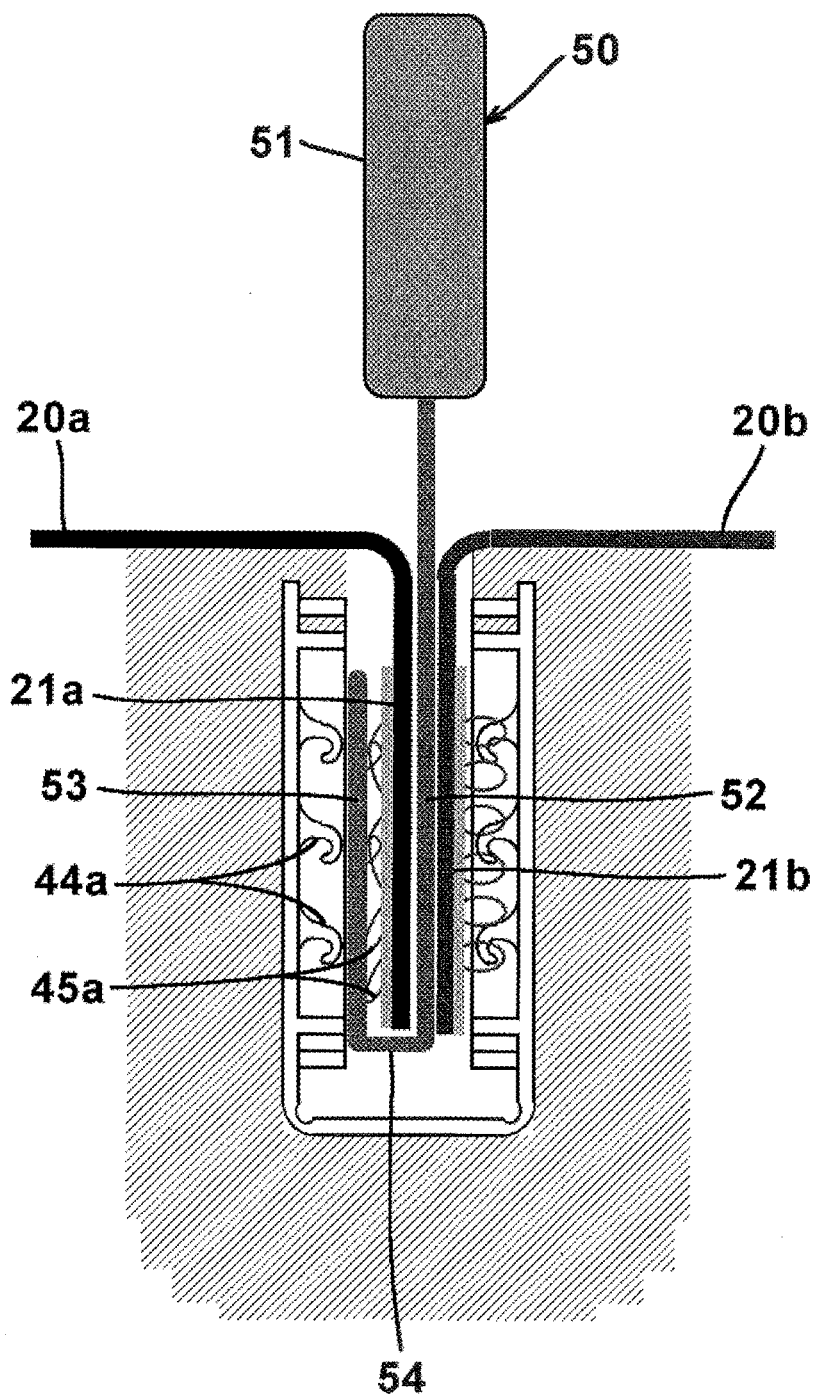
FIG. 5 is an explanatory cross-sectional view of usage of the skin material removing tool illustrated in FIG. 4.

FIG. 4 is a side view of a skin material removing tool (hereinafter, referred to merely as a "tool") 50 according to an embodiment of the present invention. The tool 50 is for removing the edge 21a or 21b of the first or second skin material 20a or 20b in a fastened state in FIG. 2 from the fastening groove 30. FIG. 5 is an explanatory cross-sectional view of a state where the tool 50 is being used. The tool 50 comprises a handle 51 that a user, a dealer and so on holds, a plate-like tool base 52 extending downward from the handle 51 and to be inserted between the front surface of the edge 21a of the first skin material 20a and the front surface of the edge 21b of the second skin material 20b in the fastening groove 30, a plate-like loop removing part 53 to be inserted between the back surface of the edge 21a or 21b of the first or second skin material 20a or 20b and the first or second hook and loop fastener 41 or 42 facing that back surface in the fastening groove 30, a plate-like guide part 54 that connects between the lower end of the tool base 52 and the lower end of the loop removing part 53. The tool 50 is used as follows. That is, the front lower end (the right side in FIG. 4) of the tool 50, namely, the front end of the guide part 54 is inserted into the fastening groove 30 from one end of the fastening groove 30 in the longitudinal direction, and then manually slid or moved in a direction of the arrow in FIG. 4 along the fastening groove 30 to the other end of the fastening groove 30 in the longitudinal direction.

In the following description of the tool 50, the right side (a sliding direction) in FIG. 4 (in a sliding direction) front and the left side is referred to as rear. The width of the guide part 54 is approximately ½ of the space between the top of the first hook 44a of the first hook and loop fastener 41 and the top of the second hook 44b of the second hook and loop fastener 42 in the fastening groove 30. The guide part 54 includes a front-side half, horizontal portion 54a and a curved portion 54b, which is gradually curved rearward and upward from the horizontal portion 54a to the rear end of the guide part 54. Each of the lower sides of the tool base 52 and the loop removing part 53 linked to the curved portion 54b has a similar shape to the curved portion 54b. The tool base 52 includes a front edge 52a vertically extending at the same position as the front end of the guide part 54 in the front and rear direction, a horizontal upper edge 52b horizontally extending rearward from the upper end of the front edge 52a, and an inclined upper edge 52c linearly inclined downward from the rear end of the horizontal upper edge 52b to the rear end of the guide part 54. The handle 51 is connected to the horizontal upper edge 52b. The loop removing part 53 has an upper edge 53a, which is curved upward and rearward from the front end of the guide part 54 and then horizontally extending to the rear end of the loop removing part 53. It can be said that the shape of the upper edge 53a of the loop removing part 53 is approximately symmetrical to the shape of the guide part 54. The maximum height of the tool base 52, namely, the interval from the horizontal portion 54a of the guide part 54 to the horizontal upper edge 52b of the tool base 52 is set at a length exceeding the depth (the vertical length) of the fastening groove 30. Further, the maximum height of the loop removing part 53, namely, the interval between the horizontal portion 54a of the guide part 54 and the rear half, horizontal portion of the upper edge 53a of the loop removing part 53 is set at a length shorter than the depth of the fastening groove 30.

Next, an example will be described, in which the first skin material 20a is removed from the right fastening groove 30 of the seat bottom 2 of the seat 1 illustrated in FIG. 1 by the tool 50. In such a case, a user holds the handle 51 of the tool 50 and puts the front end of the guide part 54 onto the longitudinal rear end of the right fastening groove 30 illustrated in FIG. 1. At this time, it may be preferable that the seat back 3 of the seat 1 is inclined rearward. Next, the guide part 54 is inserted beneath the lower end of the edge 21a of the first skin material 20a, while the tool base 52 is inserted between the front surfaces of the edges 21a, 21b of the first and second skin materials 20a, 20b in the fastening groove 30, and the loop removing part 53 is inserted between the back surface of the edge 21a of the first skin material 20a and the first hook and loop fastener 41 in the fastening groove 30 (see FIG. 5). Then, while the above-mentioned state of the tool 50 in the fastening groove 30 is maintained, the tool 50 is slid along the fastening groove 30 to the longitudinal front end of the fastening groove 30. Then, the tool 50 is pulled out of the fastening groove 30 from the longitudinal front end of the fastening groove 30. At this time, the loop removing part 53 of the tool 50 sequentially disengages the engagement between the first hooks 44a of the first hook and loop fastener 41 and the first loops 45a on the back surface of the edge 21a of the first skin material 20a from the longitudinal rear end to the front end of the fastening groove 30. Further, the curved portion 54b of the guide part 54 of the tool 50 lifts the edge 21a of the first skin material 20a, which has been removed from the first hook and loop fastener 41, and guides the lifted edge 21a to the outside of the fastening groove 30. This way, the edge 21a of the first skin material 20a can be removed from the fastening groove 30. In the above description, an example is cited in which the first skin material 20a is removed by the tool 50 from the state where the first and second skin materials 20a, 20b are fastened in the fastening groove 30. However, for instance, the second skin material 20b can be removed by applying the tool 50 from the longitudinal front end to rear end of the right fastening groove 30 illustrated in FIG. 1. Furthermore, when only one of the first and second skin materials 20a, 20b exists in the fastening groove 30 (see FIG. 3), the existing skin material can be removed from the fastening groove 30 using the tool 50, similarly. Although not illustrated, it is possible to remove both of the first and second skin materials 20a, 20b from the fastening groove 30 at a time by providing the loop removing part 53 and the guide part 54 on both sides of the tool base 52.

Figure 6:
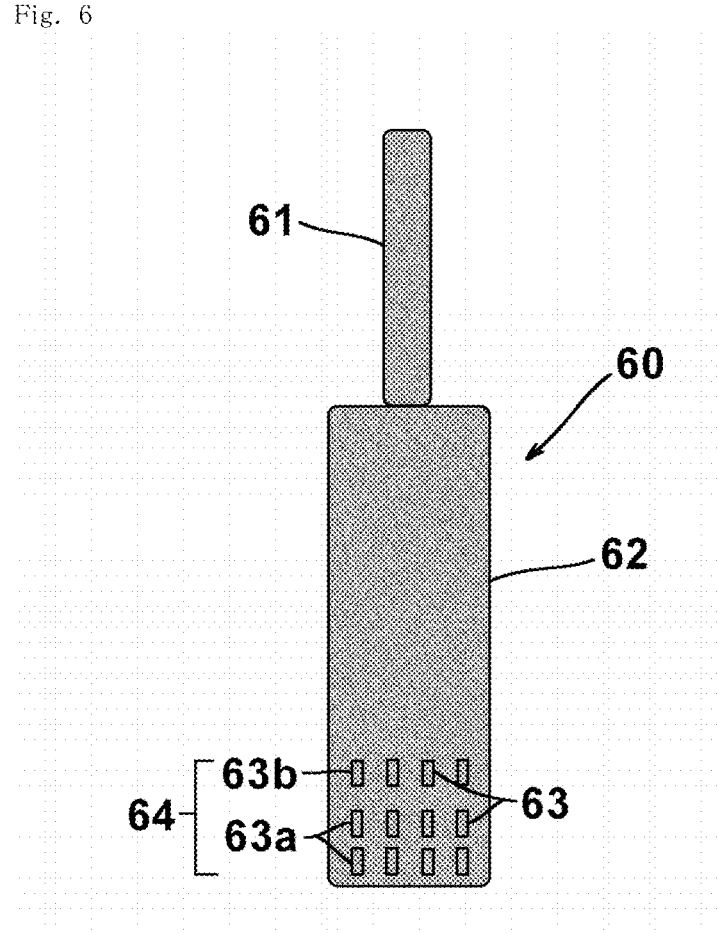
FIG. 6 is a side view of a skin material removing tool according to a second embodiment of the present invention.
Figure 7:
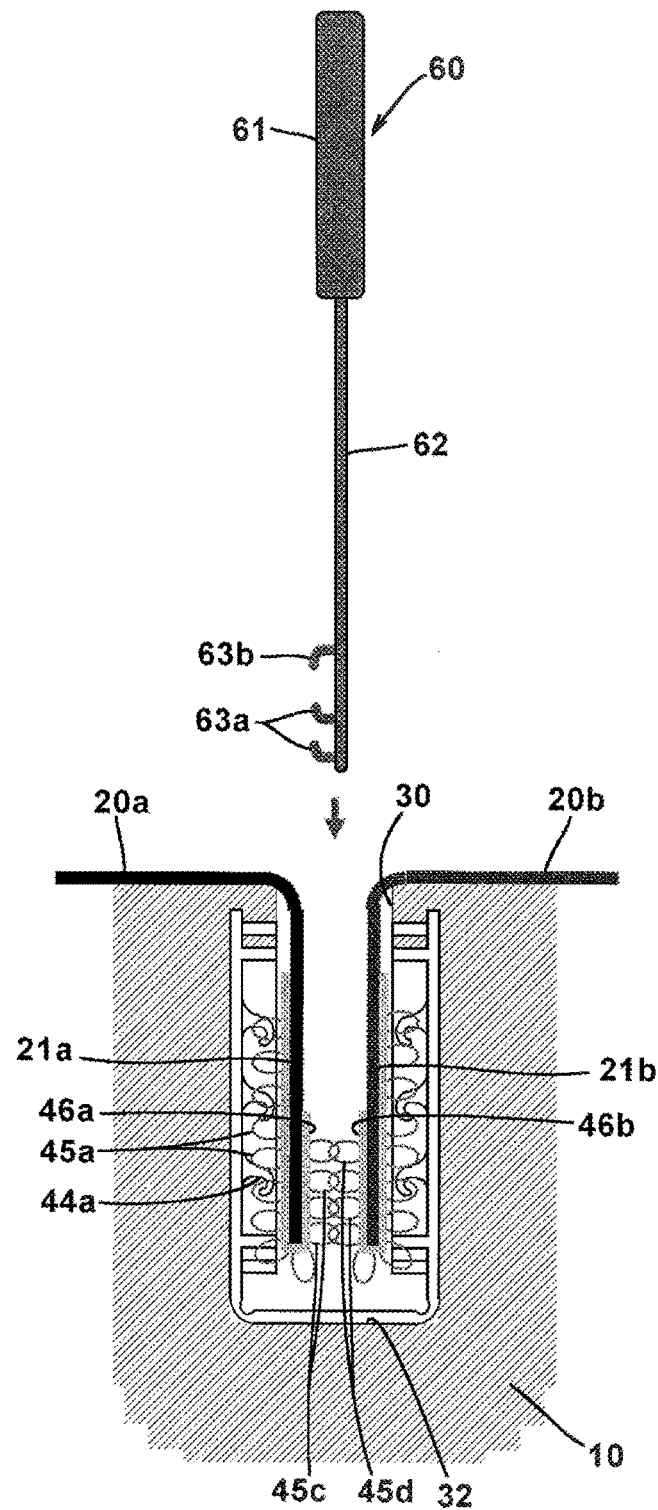
FIG. 7 is an explanatory cross-sectional view of a state just before the skin material removing tool illustrated in FIG. 6 is inserted into the fastening groove.

Next, a skin material removing tool 60 according to a second embodiment of the present invention will be described with reference to FIGS. 6 to 10. FIG. 6 is a side view of the tool 60. FIG. 7 is a front view of the tool 60 just before being inserted into the fastening groove 30. Unlike the tool 50 that is slid along the fastening groove 30, the tool 60 is inserted into the fastening groove 30 at a spot in the longitudinal direction, and then pulled out of the spot. Thus, the direction of the tool 60 to be inserted is from an upper opening of the fastening groove 30 to the bottom 32 of the fastening groove 30. As a premise that the tool 60 is to be used, the edges 21a, 21b of the first and second skin materials 20a, 20b fastened in the fastening groove 30 are different from the edges 21a, 21b described above with reference to FIG. 2 in the following point. That is, in the edges 21a, 21b of the first and second skin materials 20a, 20, not only are the first and second loops 45a, 45b provided on the back surfaces of the edges 21a, 21b, but also loops 45c, 45d for removal are provided on the front surfaces of the edges 21a, 21b on their respective lower end-side regions. For instance, this is realized as follows. That is, the first and second base 46a, 46b in which the first and second loops 45a, 45b are previously embedded are partially folded back at the lower ends of the edges 21a, 21b of the first and second skin materials 20a, 20b from the back surfaces of the edges 21a, 21b to the front surfaces, and then sewn or otherwise to the edges 21a, 21b. For clarification of the usage of the tool 60, the front surface of the edge 21a of the first skin materials 20a is spaced from the front surface of the edge 21b of the second skin materials 20b in the fastening groove 30 in FIGS. 7 to 10. Note that, however, the front surface of the edge 21a and the front surface of the edge 21b are actually in surface contact with each other, similarly to FIG. 2. Thus, the width of the fastening groove 30, for example, in FIG. 7 is substantially identical to the width in FIG. 2.

With reference to FIGS. 6 and 7, the tool 60 includes a handle 61 that a user or a dealer, etc. holds, and a rectangular plate-like tool base 62 extending downward from the handle 61 and to be inserted between the front surface of the edges 21a of the first skin material 20a and the front surface of the edges 21b of the second skin material 20b in the fastening groove 30. The tool base 62 includes a hook arrangement area 64 on one surface of the tool base 62 on the side of the lower end (insertion end), and the hook arrangement area 64 are provided with a plurality of hooks 63 for removal. The vertical length of the hook arrangement area 64 is set to almost the same as the vertical length (in the fastening groove 30) of each area (hereinafter, referred to as a "loop arrangement area") in which the loops 45c, 45d are provided on each front surface of the edges 21a, 21b of the first and second skin materials 20a, 20b. When the tool 60 is used, the hook arrangement area 64 of the tool base 62 faces the loop arrangement area on the front surface of the edge 21a or 21b of the first or second skin material 20a. The hooks 63 in the hook arrangement area 64 are classified into the following two types. The first type is first tool hooks 63a used to disengage the engagement between the first or second loops 45a or 45b on the back surface of the edge 21a or 21b of the first or second skin material 20a or 20b and the first or second hooks 44a or 44b of the first or second hook and loop fastener 41 or 42. Each of the first tool hooks 63a is oriented to be open upward, in which the hook head extends upward (in the direction opposite to the tool-inserted direction) from the hook base. The first tool hooks 63a are provided on the side of the lower end of the hook arrangement area 64. The second type is second tool hooks 63b used to remove the edge 21a or 21b of the first or second skin material 20a or 20b from the fastening groove 30 after the first tool hooks 63a disengages the engagement between the first or second loops 45a or 45b and the first or second hooks 44a or 44b of the first or second hook and loop fastener 41 or 42. Each of the second tool hooks 63b is oriented to be open downward, in which the hook head extends downward (in the tool-inserted direction) from the hook base. The second tool hooks 63b are provided on the side of the upper end of the hook arrangement area 64. In this embodiment, as illustrated in FIG. 6, the first tool hook 63a are arranged in two rows in the vertical direction on the side of the lower end of the hook arrangement area 64. The second tool hooks 63b are arranged in one row in the vertical direction on the side of the upper end of the hook arrangement area 64. In addition, as an example, there are arranged four first tool hooks 63a and four second tool hooks 63b in the horizontal (left and right) direction of FIG. 6.

Figure 8:
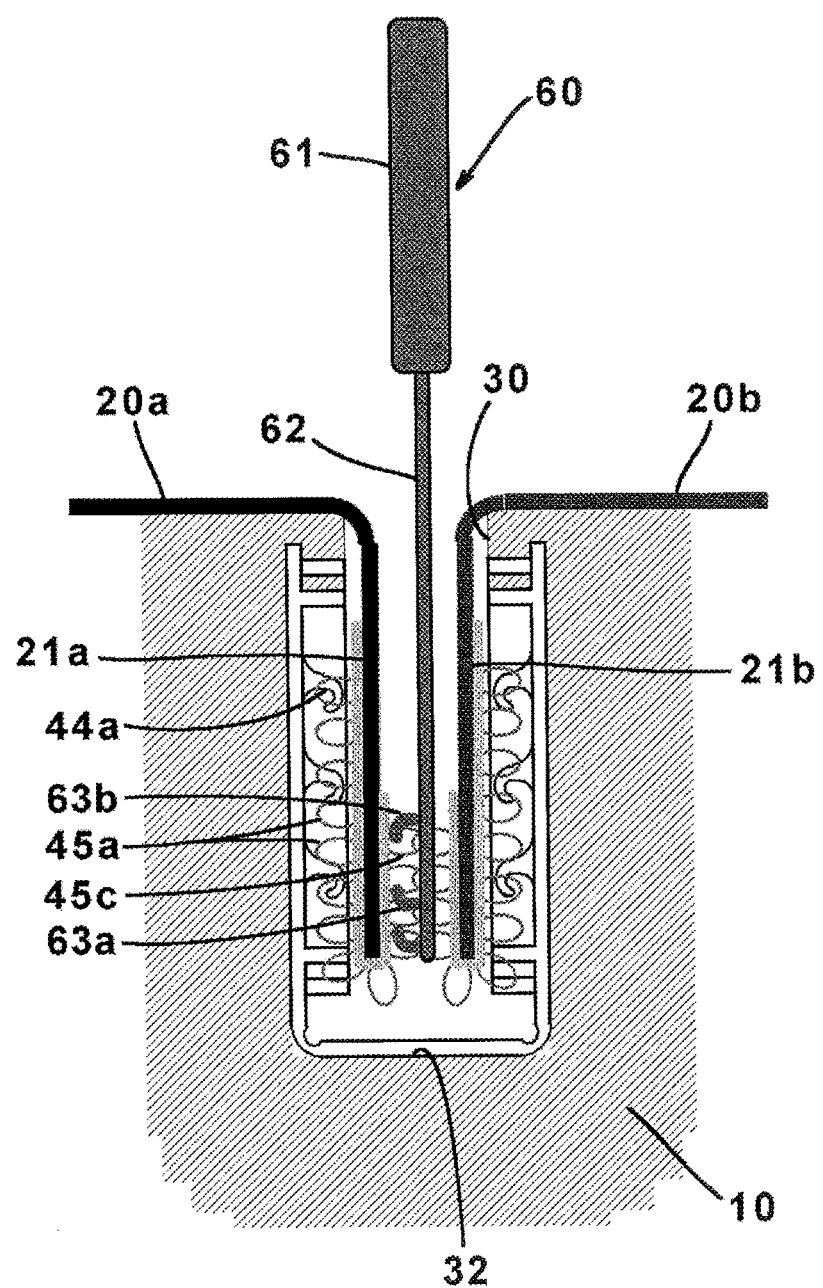
FIG. 8 is an explanatory cross-sectional view, illustrating that the skin material removing tool illustrated in FIG. 6 is inserted into the fastening groove.
Figure 9:
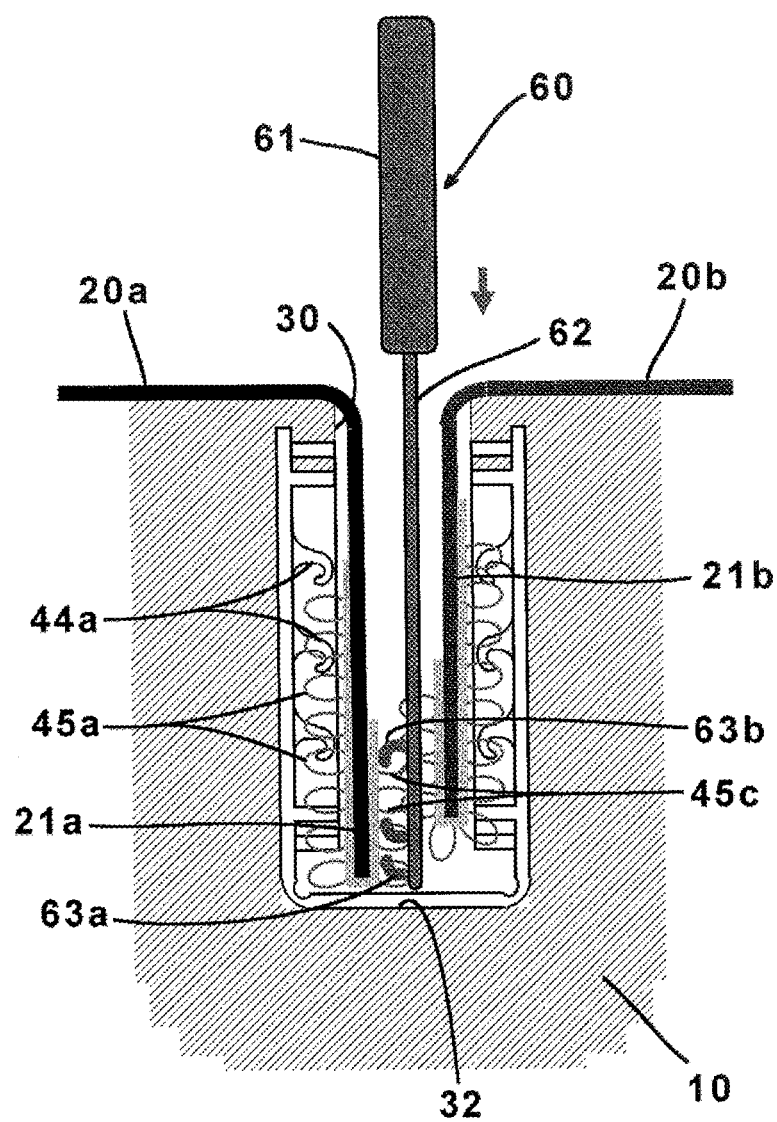
FIG. 9 is an explanatory cross-sectional view, illustrating that the skin material removing tool illustrated in FIG. 6 is further pushed down in the fastening groove than the state illustrated in FIG. 8.
Figure 10:
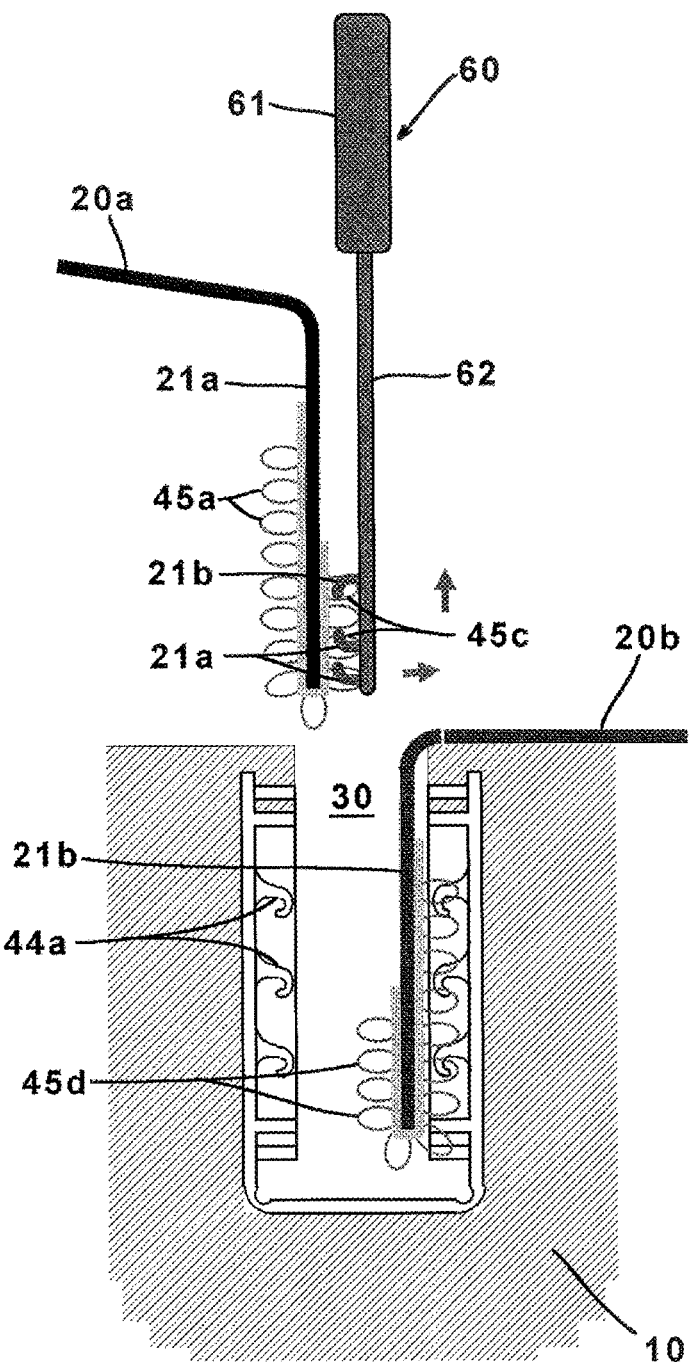
FIG. 10 is an explanatory cross-sectional view, illustrating that the first skin material is removed by using the skin material removing tool illustrated in FIG. 6.

Next, an example will be described, wherein the first skin material 20a of the first and second skin materials 20a, 20b fastened in the fastening groove 30 illustrated in FIG. 7 is removed by using the tool 60. First, the user holds the handle 61 of the tool 60 and inserts the tool body 62 into the fastening groove 30 toward the bottom 32. In this insertion, the tool body 62 can be inserted deeply (toward the bottom 32) in the fastening groove 30 without engaging the first tool hooks 63a in the side of the lower end of the hook arrangement area 64 of the tool body 62 with the loops 45c in the loop area on the front surface of the edge 21a of the first skin material 20a, because the first tool hooks 63a is open upward. When the lower end of the hook arrangement area 64 reaches approximately the same vertical position as the lower end of the loop area or as the lower end of the edge 21a of the first skin material 20a, the second tool hooks 63b, which are arranged on the side of the upper end of the hook arrangement area 64 and open downward, are engaged with the loops 45c on the side of the upper end of the loop area as illustrated in FIG. 8. This engagement stops the downward insertion of the tool body 62 to a further depth of the fastening groove 30. Then, the user pushes the tool body 62 into a further depth of the fastening groove 30 using the handle 61. As illustrated in FIG. 9, this pushes down the edge 21a of the first skin material 20a near the bottom 32 of the fastening groove 30 through the engagement of the second tool hooks 63b with the loops 45c. Thereby, the first loops 45a on the back surface of the edge 21a of the first skin material 20a are disengaged from the first hooks 44 of the first hook and loop fastener 41. Then, the user pulls up the tool body 62 out of the fastening groove 30 using the handle 61. This removes the edge 21a of the first skin material 20a from the fastening groove 30 as illustrated in FIG. 10. Note that the usage of the tool 60 requires a process for disengaging the hooks from the loops by once pushing down the skin material. Therefore, the fastening groove 30 needs a space for the push-down. In other words, there is a space between the nearest hooks of the hook and loop fastener 40 to the bottom 32 of the fastening groove 30 and the bottom 32 of the fastening groove 30 for pushing down the tool 60 to disengage the loops of the skin material from the hooks of the hook and loop fastener 40. With such a structure described above, the loops can be properly disengaged from the hooks.

DESCRIPTION OF REFERENCE NUMBERS 1 seat
2 seat bottom
10 cushion body (molded foam)
20a first skin material
20b second skin material
21a edge of first skin material
21b edge of second skin material
30 fastening groove
31 sides of fastening groove (first and second sides)
32 bottom of fastening groove
40 hook and loop fastener
41 first hook and loop fastener
42 second hook and loop fastener
44a first hook
44b second hook
44c hook base
44d hook head
45a first loop
45b second loop
45c, 45d loop for removal
50, 60 skin material removing tool
51, 61 handle
52, 62 tool base
53 loop removing part
54 guide part 63a first tool hook
63b second tool hook
64 hook arrangement area

The invention claimed is:

1. A skin material fastening structure for removably fastening a free end edge of a first skin material covering a part of a molded foam and a free end edge of a second skin material covering another part of the molded foam in a fastening groove formed in the molded foam,
wherein the free end edge of the first skin material and the free end edge of the second skin material are in an unconnected state in the fastening groove so that the free end edges of the first and second skin materials are capable of being removed from the fastening groove independently of each other,
wherein the fastening groove includes first and second sides facing each other, a bottom extending between lower ends of the first and second sides, and one or more hook and loop fasteners being fixed on the first and second sides, the hook and loop fasteners having a plurality of hooks,
wherein each of the hooks includes a hook base and a hook head which extends from the hook base toward the bottom of the fastening groove,
wherein each of the free end edges of the first and second skin materials has a plurality of loops capable of engaging with the hooks, and
wherein the free end edges of the first and second skin materials in the fastening groove are in surface contact with each other.

2. The skin material fastening structure according to claim 1, wherein each of the free end edges of the first and second skin materials has a plurality of removal loops provided on one surface of each of the free end edges opposite to another surface of each of the free end edges facing the corresponding hook and loop fastener and on a bottom-side.

3. The skin material fastening structure according to claim 1, wherein the second skin material is different from the first skin material.

4. The skin material fastening structure according to claim 1, wherein the molded foam is a seat.

5. A skin material removing tool for removing at least one of a first skin material and a second skin material fastened by a skin material fastening structure,
wherein the skin material fastening structure is for removably fastening an edge of the first skin material covering a part of a molded foam and an edge of the second skin material covering another part of the molded foam in a fastening groove formed in the molded foam,
wherein the edge of the first skin material and the edge of the second skin material are in an unconnected state in the fastening groove so that the edges of the first and second skin materials are capable of being removed from the fastening groove independently of each other,
wherein the fastening groove includes first and second sides facing each other, a bottom extending between lower ends of the first and second sides, and one or more hook and loop fasteners being fixed on the first and second sides, the hook and loop fasteners having a plurality of hooks,
wherein each of the hooks includes a hook base and a hook head which extends from the hook base toward the bottom of the fastening groove, and
wherein each of the edges of the first and second skin materials has a plurality of loops capable of engaging with the hooks,
the skin material removing tool comprising:
a tool base capable of manually moving between the edges of the first and second skin materials in the fastening groove along the longitudinal direction of the fastening groove;
a loop removing part capable of being inserted between the edge of the first or second skin materials in the fastening groove and the hooks to engage with the loops of the edge of the first or second skin materials; and
a guide part extending between a lower end of the tool base and a lower end of the loop removing part,
wherein the guide part guides the edge of the first or second skin materials, which has been stripped off of the corresponding hook and loop fastener by the loop removing part, to an outside of the fastening groove.

6. A skin material removing tool for removing at least one of a first skin material and a second skin material fastened by a skin material fastening structure,
wherein the skin material fastening structure is for removably fastening an edge of the first skin material covering a part of a molded foam and an edge of the second skin material covering another part of the molded foam in a fastening groove formed in the molded foam,
wherein the edge of the first skin material and the edge of the second skin material are in an unconnected state in the fastening groove so that the edges of the first and second skin materials are capable of being removed from the fastening groove independently of each other,
wherein the fastening groove includes first and second sides facing each other, a bottom extending between lower ends of the first and second sides, and one or more hook and loop fasteners being fixed on the first and second sides, the hook and loop fasteners having a plurality of hooks,
wherein each of the hooks includes a hook base and a hook head which extends from the hook base toward the bottom of the fastening groove, and
wherein each of the edges of the first and second skin materials has a plurality of loops capable of engaging with the hooks,
wherein each of the edges of the first and second skin materials has a plurality of removal loops, the removal loops being provided on one surface of each of the edges opposite to the other surface facing the corresponding hook and loop fastener and on a bottom-side,
the skin material removing tool comprising:
a tool base capable of being inserted between the edges of the first and second skin materials in a fastening groove,
the tool base including a hook arrangement area capable of facing an area provided with the removal loops in each of the first edge and the second edge,
the hook arrangement area being provided with at least a first tool hook in a first part of the hook arrangement area, and being provided with at least one a second tool hook in a second part of the hook arrangement area, the first part being near an insertion end of the tool base, the second part being farther away from the insertion end of the tool base than the first part,
the first tool hook including a hook base and a hook head, the hook head extending from the hook base in a direction opposite to a direction in which the tool is inserted,
the second tool hook including a hook base and a hook head, the hook head extending from the hook base in a direction in which the tool is inserted.

* * * * *